United States Patent Office 3,551,350
Patented Dec. 29, 1970

3,551,350
REAGENT SOLUTIONS FOR USE IN SERUM BICARBONATE AND CHLORIDE ANALYSIS
Harald Dahms, 22 Lakeview Road,
Ossining, N.Y. 10562
No Drawing. Continuation-in-part of application Ser. No. 690,270, Dec. 13, 1967. This application Mar. 20, 1968, Ser. No. 714,408
Int. Cl. C09k 3/00; G01n 33/16
U.S. Cl. 252—408          10 Claims

ABSTRACT OF THE DISCLOSURE

Aqueous solutions, for use as reagents in a new coulometric analysis of blood serum for bicarbonate and chloride, containing a water-soluble silver salt, a strong acid such as nitric or perchloric acid and a supporting electrolyte. A dissolved or dispersed antifoam agent may also be present.

---

This application is a continuation-in-part of my application Ser. No. 690,270 filed Dec. 13, 1967. The latter application, whose entire disclosure is incorporated herein by reference, discloses a process and apparatus for analyzing blood serum to determine its content of both chloride and bicarbonate, as well as potassium and sodium.

In a preferred embodiment, disclosed in my parent application, the serum is treated by adding a predetermined amount of strong acid and a predetermined amount of silver ion. The amount of added acid is sufficient to convert all the bicarbonate to carbon dioxide and leave an excess of acid; the $CO_2$ thus generated is driven out of the solution, as a gas. The amount of added silver ion is sufficient to combine with part of the chloride ion and remove it from solution as a precipitate of insoluble silver chloride, leaving a concentration of dissolved chloride ion which is less than the concentration of hydrogen ion in the acidified serum. The acid is preferably a strong chloride-free acid whose anion does not react with silver ion in the solution to form an insoluble or un-ionized compound.

A D.C. electric current is then passed through the solution, using a silver anode. As long as there are chloride ions in the solution, the silver ions generated at the silver anode will combine with the chloride ions, forming a precipitate of silver chloride. When, however, all the chloride ions have been thus removed from the solution, the continued passage of the current markedly increases the silver ion concentration; the endpoint can thereby be detected amperometrically.

The passage of the D.C. current (when suitable electrodes are employed) also results in the generation of hydroxyl ions at the cathode, as by electrolysis of the water of the solution according to the equation $$H_2O + e \rightarrow OH^- + \tfrac{1}{2}H_2$$

and also, in part, by discharge of hydrogen ions at the cathode (according to the equation $H^+ + e \rightarrow \tfrac{1}{2}H_2$). This neutralizes the acidity. The neutral endpoint can be detected by a pH meter in the solution.

The method may be carried out using apparatus which includes an electrolysis cell having a silver anode and a suitable cathode (for generating the silver ions at the anode and the hydroxyl ions at the cathode), an amperometric endpoint detector (for detecting the appearance of silver ions which increase the concentration of electroactive species in the solution), and a glass electrode serving as a pH meter. In the preferred embodiment of the apparatus, there is also means for bubbling air through the solution to insure that substantially all the $CO_2$ generated by the acidification has been removed from the solution. To minimize foam formation owing to proteinaceous foam stabilizing materials present in the serum, it is preferred to have present an antifoam agent, of known type (e.g. a dimethyl silicon liquid).

One aspect of this invention relates to the reagent solution (also termed "dilution solution" herein) which is added to the serum to form the mixture through which the D.C. current is to be passed. Generally about 3 to 12 ml. of the reagent solution is added to about 0.01 to 0.1 ml. of serum. The reagent solution is a solution in water of a water-soluble silver salt, such as silver nitrate or silver perchlorate, a strong acid such as nitric or perchloric acid and a supporting electrolyte. A dissolved or dispersed antifoam agent may also be present to avoid the need for separate addition of antifoam agent to the sample cup or other parts of the apparatus.

In the reagent solution of this invention the $Ag^+:H^+$ molar ratio is in a range of about 1.3:1 to 0.4:1 (preferably about 1.2:1 to 0.6:1) and is such that (on electrolysis as described above) the chloride endpoint will occur at about the same time as or, more preferably, prior to, the acid-base endpoint. This not only makes it possible to use relatively simple equipment in which the electrolysis current is shut off merely when the acid-base endpoint is reached, it also makes it possible to avoid the passage of electrolysis current through a basic solution and the consequent formation of silver carbonates, hydroxides, oxides and mixtures or mixed compounds thereof and decrease in the accuracy of the chloride endpoint.

The chloride ion concentration in human serum is generally within the range of about 8–125 mM. and the bicarbonate ion concentration is within the range of about 15–30 mM. By adding to 0.1 ml. of human serum 5 ml. of a reagent solution having a concentration of 1.5 mM. $HNO_3$ and 1.7 mM. $AgNO_3$ (that is, by adding $7.5 \times 10^{-5}$ mol of $H^+$ per ml. of serum), one can obtain a treated solution whose chloride endpoint always appears before the acid-base endpoint. For example, if the serum has concentration of 25 mM. $HCO_3^-$ and 110 mM. $Cl^-$, the constituents of the resulting solution made by mixing the foregoing dilution solution and serum (after formation of an AgCl precipitate and the release of the $CO_2$) may be calculated as follows:

0.1 ml. of 25 mM. $HCO_3^- = 2.5 \times 10^{-6}$ mols $HCO_3^-$
5.0 ml. of 1.5 mM. $H^+ = 7.5 \times 10^{-6}$ mols $H^+$
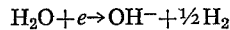
Resulting solution = $5.0 \times 10^{-6}$ mols $H^+$ 0.1 ml. of 110 mM. $Cl^- = 11.0 \times 10^{-6}$ mols $Cl^-$
5.0 ml. of 1.7 mM. $Ag^+ = 8.5 \times 10^{-6}$ mols $Ag^+$ Resulting solution = $2.5 \times 10^{-6}$ mols $Cl^-$ If this solution is then electrolyzed, using a current of 10 mA., then, according to Faraday's Law, the endpoint of the chloride liberated will occur after about 26 seconds and the endpoint of the acid titration after about 52 seconds of electrolyzation. Similarly, at other bicarbonate and chloride levels within the range found in human serum, there will be no overlap, or reversal of the order, of the endpoint times when the foregoing dilution solution is used.

It will be understood that one can vary the absolute concentrations of the $Ag^+$ and $H^+$ in the reagent solution and, correspondingly, vary the amount of reagent solution to be used per unit volume of serum. In the practical ranges, the $Ag^+$ concentration will be about $4 \times 10^{-5}$ M to $3 \times 10^{-3}$ M and the $H^+$ concentration will be about $5 \times 10^{-5}$ M to $4 \times 10^{-3}$ M.

The presence of supporting electrolyte, such as nitrate salt, in the reagent solution helps to reduce migration of silver ions to the cathode and to eliminate electrical fields, in the solution, which could interfere with the measurement of pH. The concentration of the supporting electrolyte in the final treated serum may be, for example, in the range of about 0.01–0.5 molar, preferably in the range of about 0.05–0.5 M. While the supporting electrolyte could be furnished by the use of large amounts of acid, it is preferred to avoid this since, as previously discussed, it reduces the accuracy of the bicarbonate analysis. In a preferred form the acid concentration, after the treatment of the serum, is below 0.002 M. more preferably about 0.001 M. and the supportin electrolyte is supplied by the inclusion of a neutral salt. (The protein in the serum combines with part of the added hydrogen ion, before the neutral endpoint is reached in the previously described electrolysis of the solution, and the concentration of free $H^+$ in the treated solution is therefore less than that which would be calculated solely on the basis of the amount of $H^+$ added and the amount of bicarbonate in the serum; in one preferred form the calculated hydrogen ion concentration in a treated serum of low bicarbonate content is 0.0012 M.) To avoid buffering effects as the neutral endpoint is approached, it is prefrered to use salts of alkali metals (e.g. Na, K, Li, Rb, Cs) as the supporting electrolyte. Where the solution is also be to subjected to flame photometry, in which the sodium and potassium ion concentrations of the serum are measured, it is best to avoid additions of salts of those two ions; here neutral lithium salts are preferred, and cesium and rubidium salts can be employed as well. The salts may be those of anions other than nitrate; for example, perchlorate ions, which do not form precipitates with the silver ion, may be used. When the lithium salt is used to supply both the internal standard and the supporting electrolyte its concentration is preferably within the range of about 10 mM. to 500 mM., more preferably in the range of about 10 mM. to 100 mM.

In the reagent solutions of this invention the concentration of the supporting electrolyte is in the range of about 0.01–0.5 molar, preferably about 0.05–0.5 M and most preferably about 0.03 M to 0.2 M. In a typical reagent solution the concentrations are as follows: 75 mM. $LiNO_3$, 1.5 mM. $HNO_3$ and 1.7 mM. $AgNO_3$. In another reagent solution, principally for use when the serum sample treated therewith is not to be used for determination of $K^+$ and $Na^+$ contents of the serum, the concentrations are: 0.1 M $KNO_3$, 1.875 mM. $HNO_3$ and 2.125 mM. $AgNO_3$, for a reagent solution to be used in amount of 4 ml. per 0.1 ml. of serum.

Suitable antifoam agents that may be included in the reagent solution are silicones and particularly the well known aqueous emulsions of dimethylpolysiloxane such as the silicone antifoam products known as "AF–60" (of 30% silicone solids content and containing nonionic emulsifier), AF–10, AF–71 and AF–72 (of 10%, 10% and 30% solids content, respectively, all containing non-ionic emulsifier) sold by General Electric Co. Only a very small amount of the antifoam agent is needed, usually well below 0.1% of silicone, such as 5 to 100 p.p.m., e.g. 0.005% of silicone.

For best results, the reagent solutions of this invention should be substantially free of polyvalent anions, chloride ions and bicarbonate ions and they should also be free of hydratable metal ions (e.g. polyvalent metal ions such as $Ca^{++}$) in substantial concentration; i.e. hydratable ions present in such concentration that, in the pH range of 4 to 7.5, they undergo substantial hydrolysis (combining with $OH^-$ ions sufficiently to change the acid concentration by more than $10^{-5}$ M). Such hydration uses up $OH^-$ ions produced in the electrolysis and thus changes the quantity of electricity needed to reach the neutral endpoint. For the $10^{-5}$ M change mentioned above the change in quantity of electricity will be about 1%. It is within the broader scope of the invention, however, to use reagent solutions which contain a predetermined known amount of these ions, such as an amount which changes the quantity of electricity used in the electrolysis by 5%; in this case an appropriate correction must be made in calculating or displaying the amount of bicarbonate present in the serum.

It is also within the broader scope of this invention to supply the contents of the reagent solutions in the form of concentrates which can be converted to the previously described reagent solutions by simple addition of water. Thus, one may use a concentrated aqueous solution which is intended to be diluted with about 10 to 200 times its own water content. In such concentrated solutions the concentrations of the components will thus be about 10 to 200 times those given previously, but the ratio of $Ag^+$ to $H^+$ will be the same.

Some commercial flame photometers of the type in which a lithium salt serves for internal standardization are designed to operate with solutions whose lithium salt concentration is 0.015 N. Since this concentration is less than the preferred minimum lithium concentration of about 0.06 N, it is often desirable to use as the flame photometer a known device (such as that made by Instrumentation Laboratory Inc. of Boston, Mass.) which incorporates a suitable mixing arrangement (e.g. a proportioning pump such as a peristaltic pump) in the feed lines leading to the flame. Thus, using a known two-tube arrangement, passing through a proportioning pump, in which the volumetric rate of flow through one feed tube is three times that in the second feed tube (with the tubes merging downstream of the pump and upstream of the flame) one may supply the first feed tube with deionized water and the second tube with a treated serum (which has just been analyzed, as previously described, for determination of its chloride and bicarbonate content) in which the $LiNo_3$ concentration is 0.06 M; the feed to the flame will thus have a $LiNO_3$ concentration of 0.015 M.

Another aspect of this invention relates to reagent solutions for use in the conventional constant current coulometric chloride titrations (e.g. with the Cotlove instrument). At present such analyses are carried out by treating 0.1 M. serum with 4 ml. of a reagent solution containing gelatin and being 0.1 N in $HNO_3$ and 10% in acetic acid. In this aspect of the invention I use a reagent solution containing a substantial proportion of silver ions, for combination with most of the chloride ion present in the serum; the titration time is thereby shortened and the accuracy of the analytical method is increased. Thus if only a given time is allowed for each analysis in the laboratory, the present invention makes it possible to devote almost all this time to the physiologically important range of 80–125 meq. per liter of chloride ion in the serum, using lower electrolysis rates. Conversely, at a given electrolysis rate the endpoint will be reached much more quickly.

Gelatin is usually included in the reagent solution conventionally used for coulometric chloride titration. Clinical laboratories generally follow the practice of making up a large number of individual vials of a gelatin solution (each vial containing enough gelatin for one day's use) then freezing all the vials and, daily, removing a vial from the freezer and repeatedly pouring out enough solution from that vial to dilute each serum sample. All this is done because the gelatin is a good culture medium and is attacked by microorganisms such as molds in solution even when an antibacterial agent such as Thymol Blue is present. By including the gelatin in my silver-containing acidic reagent solution this biological attack is avoided as is the whole procedure of freezing individual vials and separately adding the gelatin solution. A typical aqueous reagent solution for this purpose, according to my invention, contains $AgNO_2$ in $2 \times 10^{-3}$ M concentration, 0.3 g. of gelatin per liter of solution, $HNO_3$ in 0.1 N concentration and 100 ml. glacial acetic acid per liter of solution and may be stored for long periods at room temperature.

It is understood that the foregoing detailed description is merely given by way of illustration and that many variations may be made therein without departing from the spirit of the invention.

I claim:

1. An acidic reagent solution for use in pretreating blood serum in an analysis of the chloride and bicarbonate contents of the serum by electrolytic titration, said reagent solution consisting essentially of water, a dissolved silver salt, a dissolved acid and a dissolved supporting electrolyte, the $Ag^+:H^+$ mol ratio being in the range of about 1.3:1 to 0.4:1 and the concentration of supporting electrolyte being in the range of 0.01 to 0.5 M.

2. A reagent solution as in claim 1 which is substantially free of chloride ions, bicarbonate ions, and of hydrolizable metal ions in concentrations such that substantial hydrolysis of the ion takes place in the pH range of 4 to 7.5.

3. A concentrate which on dilution with 10 to 200 times its weight of water yields the acidic reagent solution of claim 1, said concentrate consisting essentially of water, a dissolved silver salt, a dissolved acid and a dissolved supporting electrolyte, the $Ag^+:H^+$ mol ratio being in the range of about 1.3:1 to 0.4:1 and the concentration of supporting electrolyte being such that after said dilution of the concentrate with 10 to 200 times its weight of water the concentration of supporting electrolyte is about 0.01 to 0.5 M.

4. A solution as in claim 1 in which the concentration of silver ion is in the range of about $4 \times 10^{-5}$ M to $3 \times 10^{-4}$ M and the hydrogen ion concentration is in the range of about $5 \times 10^{-3}$ M.

5. A reagent solution as in claim 4 consisting essentially of silver nitrate, nitric acid and lithium nitrate.

6. A reagent solution as in claim 1 containing an antifoam agent.

7. A reagent solution as in claim 6 in which the antifoam agent is a dispersion of dimethyl polysiloxane.

8. A reagent solution as in claim 1 in which the anions in the solution consist essentially of nitrate or perchlorate ions.

9. A reagent solution as is claim 8 in which the anions in the solution consist essentially of nitrate ions.

10. A solution as in claim 8 in which the supporting electrolyte consists essentially of a lithium salt.

References Cited

M. Rockenmacher, Am. J. Clin. Path., 33 (4) 349–354 (1960).

E. Cotlove, "Standard Methods of Clinical Chemistry," vol. 3, D. Seligson, ed., 81–92, Academic Press, New York, 1961.

JOSEPH SCOVRONEK, Primary Examiner

S. MARANTZ, Assistant Examiner

U.S. Cl. X.R.

23—230